(12) United States Patent
Dubreuil (10) Patent No.: US 12,447,692 B2
(45) Date of Patent: Oct. 21, 2025

(54) SYSTEM AND METHOD FOR JOINING HIGH-PERFORMANCE THERMOPLASTIC COMPONENTS

(71) Applicant: AIRBUS ATLANTIC, Rochefort (FR)

(72) Inventor: Laurent Dubreuil, Pibrac (FR)

(73) Assignee: AIRBUS ATLANTIC, Rochefort (FR)

( * ) Notice: Subject to any disclaimer, the term of this patent is extended or adjusted under 35 U.S.C. 154(b) by 256 days.

(21) Appl. No.: 18/255,430

(22) PCT Filed: Dec. 9, 2021

(86) PCT No.: PCT/EP2021/084926
§ 371 (c)(1),
(2) Date: Jun. 1, 2023

(87) PCT Pub. No.: WO2022/122881
PCT Pub. Date: Jun. 16, 2022

(65) Prior Publication Data
US 2024/0025127 A1    Jan. 25, 2024

(30) Foreign Application Priority Data
Dec. 11, 2020   (FR) ..................... 2013043

(51) Int. Cl.
*B29C 65/34*   (2006.01)
*B29C 65/00*   (2006.01)
*B29C 65/48*   (2006.01)
*B29C 65/50*   (2006.01)
(Continued)

(52) U.S. Cl.
CPC ...... *B29C 65/3468* (2013.01); *B29C 65/3444* (2013.01); *B29C 65/3492* (2013.01);
(Continued)

(58) Field of Classification Search
CPC ........... B29C 65/3444; B29C 65/3468; B29C 65/3492; B29C 65/4815; B29C 65/5014;
(Continued)

(56) References Cited

U.S. PATENT DOCUMENTS

| 5,389,184 A | 2/1995 | Jacaruso et al. |
| 2017/0043528 A1 | 2/2017 | Conway |
| 2019/0160759 A1* | 5/2019 | Vázquez Castro ...... B29C 66/41 |

FOREIGN PATENT DOCUMENTS

JP    5560121 B2    7/2014

OTHER PUBLICATIONS

Fernandez Villegas I et al., "Process and performance evaluation of ultrasonic, induction and resistance welding of advanced thermoplastic composites", Journal of Thermoplastic Composite Materials, Sage Publications, US, vol. 26, No. 8, Sep. 1, 2013, pp. 1007-1024.
(Continued)

*Primary Examiner* — Gerard Higgins
(74) *Attorney, Agent, or Firm* — Alumen IP Law PC (57) ABSTRACT

A device for joining a first component to be welded to a second component to be welded, the joining device having at least one electrically conductive, resistive heating film which comprises a central connection portion and two lateral electrical connection portions. The joining device comprises at least one first electrical insulation member which is positioned in contact with the first face of the heating film, and at least one second electrical insulation member which is positioned in contact with the second face of the heating film, the two electrical insulation members being configured to allow the transfer of heat and to prevent the flow of electric current between the heating film and each component to be welded.

13 Claims, 7 Drawing Sheets

(51) Int. Cl.
  *B29C 65/78* (2006.01)
  *B29K 105/16* (2006.01)
  *B29K 709/08* (2006.01)
  *B29L 31/30* (2006.01)

(52) U.S. Cl.
  CPC ...... *B29C 65/4815* (2013.01); *B29C 65/5014* (2013.01); *B29C 65/5057* (2013.01); *B29C 65/7814* (2013.01); *B29C 66/1122* (2013.01); *B29C 66/131* (2013.01); *B29C 66/345* (2013.01); *B29C 66/4722* (2013.01); *B29C 66/474* (2013.01); *B29C 66/524* (2013.01); *B29C 66/721* (2013.01); *B29C 66/73921* (2013.01); *B29C 66/919* (2013.01); *B29C 66/929* (2013.01); *B29C 66/7212* (2013.01); *B29C 66/73141* (2013.01); *B29K 2105/167* (2013.01); *B29K 2709/08* (2013.01); *B29K 2995/0007* (2013.01); *B29L 2031/3076* (2013.01)

(58) Field of Classification Search
  CPC ............ B29C 65/5057; B29C 65/7814; B29C 66/112; B29C 66/1122; B29C 66/131; B29C 66/301; B29C 66/345; B29C 66/4722; B29C 66/474; B29C 66/524; B29C 66/532; B29C 66/61; B29C 66/71; B29C 66/721; B29C 66/7212; B29C 66/73141; B29C 66/73921; B29C 66/91211; B29C 66/91221; B29C 66/91645; B29C 66/919; B29C 66/929; B29K 2709/08; B29K 2995/0007; B29L 2031/3076
  See application file for complete search history.

(56) References Cited

OTHER PUBLICATIONS

Search Report from the French Intellectual Property Office on corresponding FR application (FR2013043) dated Aug. 6, 2021.
International Search Report and Written Opinion on corresponding PCT application (PCT/EP2021/084926) from International Searching Authority (EPO) dated Mar. 16, 2022.

* cited by examiner

SYSTEM AND METHOD FOR JOINING HIGH-PERFORMANCE THERMOPLASTIC COMPONENTS

TECHNICAL FIELD

The present invention relates to the field of joining thermoplastic components and more specifically the joining by resistive welding of high-performance thermoplastic components, in particular, in the aeronautical field.

In a known manner, the components intended to be mounted on an aircraft, generally made of metal material, are joined by riveting or other added fasteners. However, the addition of added components significantly increases the mass of the aircraft. Therefore, such an assembly is increasingly replaced by a welding method that allows both the number of components to be limited (saving time and mass).

Furthermore, in the aerospace sector, metal components are most often replaced by lighter composite components. It is especially known to use components made of a high-performance thermoplastic material, such as polyaryletherketone known as PAEK, or polyetherketone, known as PEKK, having good mechanical properties. Reinforcement fibers, commonly carbon fibers, are usually impregnated into the thermoplastic matrix to reinforce the component, giving it both strength and lightness.

In a known manner, high-performance thermoplastic components are usually assembled using an induction welding method. In this respect, document WO2020079010 is known, wherein an insert comprising a conductive structure is positioned between two components to assemble and moved along the connection zone defined between the two components. By heating, the conductive structure locally melts the thermoplastic matrix at the interface between the two components on a local portion of the connection zone. When the material is melted in the local portion, the insert is moved to another local portion and the two components to be assembled are pressed together to be welded after cooling and solidifying the melted thermoplastic matrix. The insert allows successive heating of each of the local portions of the connection zone and is removed at the end of assembly.

However, such induction welding locally heats excessively and unevenly, which may impact the mechanical performance of the components to be welded. In addition, if the components are too far apart on a local portion, if they are too stiff, it is not possible to press the two components at any point, which may locally alter the strength of the connection zone. Such a defect is known to those skilled in the art under the term "docking defect".

To remedy this disadvantage, from document EP3488999A1 is known a method for joining two composite components to be welded, wherein a graphene film is deposited at the interface between the two components along the entire connection zone. Graphene, with significant thermal diffusion properties, is connected to a resistive heating system. By heating, graphene uniformly melts the thermoplastic matrix at the interface between the two components to be welded along the entire connection zone, which is advantageous. The two components are then welded together by mixing their thermoplastic matrices.

However, in such a method, the graphene, having melted the thermoplastic matrix in the connection zone, may come into contact with the carbon fibers of the components to be welded. The graphene connected to the resistive heating system conducts electricity and transfers it by contact to the carbon fibers. This may lead to short circuits which may cause local overheating and damage the components to be welded. This then results in poor welding quality.

An immediate solution would be to use thermoplastic components with non-conductive fibers. However, such a solution cannot be considered in terms of performance and cost.

To date, there is no system or method allowing the joining of composite components comprising reinforcement fibers impregnated in a high-performance thermoplastic matrix in an effective manner without risking damage to the components to be welded.

The invention thus aims to eliminate at least some of these disadvantages by proposing a simple and effective system and method for joining two thermoplastic components, making it possible both to ensure the connection between the two components at any point of the interface area, while avoiding a risk of damage to the components.

It is known from JP5560121 a two-piece composite assembly system wherein a heating element, arranged between the two composite components to be assembled, comprises an insulating surface, obtained by a surface treatment. The insulating surface makes it possible to limit the transfer of electrical current between the heating film and the two components to be joined. Also known from US20170043528 and U.S. Pat. No. 5,389,184 are assembly systems comprising a heating film and two electrical insulation members, which make it possible to limit the flow of electrical current between the heating film and each composite component, in order to protect them. However, the assembly systems described in US20170043528 and U.S. Pat. No. 5,389,184 are configured to be intact in the welded zone after the assembly operation of the two components and are bulky, which may alter the mechanical properties of the composite components and the welded zone between the composite components.

SUMMARY

The invention relates to a device for joining a first component to be welded to a second component to be welded according to a common welding zone, configured to form a welded zone once the components to be welded are joined, each component to be welded being made of a composite material comprising reinforcement fibers impregnated in a thermoplastic matrix, each component to be welded having a flat inner surface to be welded, the inner surfaces of the components to be welded being positioned opposite each other, the joining device being configured to be at least partially integrated into the welded area, the joining device comprising:
  at least one electrically conductive, resistive heating film, the heating film having a first flat face and a second flat face opposite the first face, the heating film comprising:
    a central connection portion, configured to be mounted according to the common welding zone between the inner surfaces of the two components to be welded to weld them, and
    two lateral electrical connection portions, configured to be mounted outside of the common welding zone, the lateral portions being configured to be electrically connected to a source of current so as to permit a rise in the temperature of the central portion to an operating temperature.
The joining device is remarkable in that it comprises:
at least one first electrical insulation member, positioned in contact with the first face of the heating film opposite the central portion and configured to be positioned opposite the inner surface of the first component to be welded, and at least one second electrical insulation member, positioned in contact with the second face of the heating film opposite the central portion and configured to be positioned opposite the inner surface of the second component to be welded, the two electrical insulation members being configured to allow heat transfer and prohibit the flow of electric current between the heating film and each component to be welded.

The electrical insulation members of the joining device according to the invention advantageously make it possible to limit the contact of the resistive heating film with the reinforcement fibers of the composite components to be welded, which makes it possible to limit the transfer of electrical current into the components to be welded and thus avoid the risk of short-circuit.

The heating film mounted between the two components to be welded makes it possible to melt the thermoplastic matrix of the components to be welded to enable their welding. Heating the interface directly and quickly makes it possible to limit heat diffusion in the thickness of the component. Only the interface is melted, ensuring the integrity of the welded components.

In fact, the resistive heating film allows uniform, fast and homogeneous heating of the inner surfaces of the components to be welded at the central connection portion, while limiting the risk of local overheating. Such a resistive heating film also allows control of the heating temperature by controlling the applied voltage, which allows precise management of the temperature rise, notably allowing a temperature plateau to be maintained ensuring melting of the thermoplastic matrices and the mixing thereof, while controlling the crystallinity rate of each thermoplastic matrix. This thus ensures optimum mechanical performance in the components to be welded, even at their interface in the common welding zone.

The joining device makes it possible to join two components to be welded by a welding operation, which makes it possible to limit the mass of the assembly and the aircraft, by eliminating the need to add assembly components, for example rivets. Welding with a resistive heating film also enables efficient, fast welding without the risk of a short circuit or overheating.

Preferably, the heating film is a graphene film. Graphene is a material with high heat resistance and has high electrical conductivity, enabling it to perform its role effectively. In addition, the behavior of graphene is known.

In one embodiment, each electrical insulation member is made of a composite material comprising a thermoplastic matrix, allowing the use of an electrical insulation member having low electrical conductivity, allowing the thermoplastic matrix of each component to be welded to be melted, without damaging them.

Preferably, each electrical insulation member is made of a high-performance thermoplastic resin, more preferably, in a polyaryletherketone PAEK or polyetherketone PEKK polymer resin.

Preferably, each electrical insulation member has glass fibers, allowing the use of robust electrical insulation members while ensuring limited electrical conductivity. Non-conductive glass fibers that do not transfer electrical energy to the components to be welded, efficiently.

More preferably, each electrical insulation member is made of glass fibers impregnated with a thermoplastic polyaryletherketone PAEK or polyetherketone PEKK matrix.

Preferably, the heating film has a thickness between 1 µm and 50 µm. Such a thickness allows the heating film, intended to be integrated into the welded zone, not to generate any overthickness at the interface between the two components to be welded, which may cause a local offset of the inner surfaces of each component and hence an assembly fault.

In a preferred embodiment, each electrical insulation member is in the form of an insulating film, having a thickness between 0.05 mm and 0.2 mm. Such a thickness allows an electrical insulation member that is both thin enough to limit the footprint of the joining device and thick enough to form a barrier to the conductive graphene fibers of the heating film. Such a thickness also allows a thin, space-saving complete joining device, which may remain in the welded zone after joining of the two components to be welded, without impacting the mechanical characteristics of the components.

Preferably, the heating film has a thickness of between 0.0002 and 0.05 mm. Such a thickness is large enough to allow the heating film to be deposited in an even layer without being damaged while allowing homogeneous electrical properties throughout the heating film. In addition, a thickness of less than 0.05 mm makes it possible to limit the footprint of the heating film and therefore of the joining device while ensuring a device at least cost.

Preferably, the assembly formed by the heating film and the two electrical insulation members has a thickness between 0.1 mm and 0.5 mm. The joining device therefore does not impact the mechanical properties of the components to be welded and has little impact on the mass of the assembly and therefore of the aircraft.

Preferably, as the heating film has a length extending along a longitudinal axis, the heating film has a variable thickness along the length. The heating power of the heating film may be varied locally by means of a variable thickness.

Preferably, as the heating film has a width extending along a lateral axis, the heating film has a variable thickness over the width, so as to locally vary the heating power of the heating film.

Preferably, the thickness of the heating film varies a maximum of ten times the minimum thickness of the heating film.

In a preferred embodiment, the joining device comprises at least two electrical connection members, each positioned in contact with the two lateral portions of the heating film so as to enable the electrical connection of the heating film to the source of current.

Preferably, each electrical connection member is in the form of a copper strip, allowing the use of a highly conductive element, which makes it possible to limit the risks of dissipation of electrical energy. Alternatively, each electrical connection member is in the form of a conductive ink, eliminating the need to add additional elements and simplifying the storage of the different members.

Preferably, the electrical connection members are mounted on the same face of the heating film, which makes it easier to assemble the joining device, preferably on an easily accessible upper face.

Preferably, the lateral portions are at least partially, preferably fully, detachable, allowing them to be removed after the joining operation to lighten the assembly and improve the visual appearance. In one embodiment, the heating film comprises a pre-cut between each lateral portion and the central portion, allowing for simple and quick removal.

Preferably, the operating temperature is between 330 and 450° C., so as to ensure that the thermoplastic matrix of each component to be welded is melted, without risking local overheating.

In an embodiment, the joining device is packaged in rolls, allowing easy and fast depositing on the inner surface of one of the components to be welded. The joining device may thus advantageously be cut to the desired length directly and conveniently at the point of assembly. A packaging in a roll, in the manner of an adhesive roll, allows a sufficient and non-excessive length to be installed accurately in the common welding zone, reducing the risk of under-estimated dimensional errors (source of time loss) and waste. Alternatively, the joining device may be packaged in the form of a pre-cut plate or patch.

In one embodiment, the joining device comprises at least one thickness compensating member, positioned on at least one of the electrical insulation members, in order to compensate for a gap between the electrical insulation member and the component to be welded, the thickness compensating member being formed at least partially of thermoplastic matrix. Adding one or more thickness compensating members makes it possible to compensate, for example, for a docking fault between the components to be welded or to fill a relief locally.

Preferably, each thickness compensating member is formed from the same thermoplastic matrix as the thermoplastic matrix of the heating film, ensuring material continuity. In an alternative embodiment, each thickness compensating member comprises glass fibers impregnated in a thermoplastic matrix, preferably a PAEK thermoplastic matrix.

In one embodiment, the joining device comprises an internal temperature measuring member, so as to control in real time the temperature inside the joining device itself, in the welding zone. Preferably, the internal temperature measuring member is mounted directly on the heating film, allowing optimum reading at the heart of the interface between the two components to be welded. Preferably, the internal temperature measuring member is in the form of one or more Bragg grating optical fibers inserted between the heating film and one of the electrical insulation members.

Preferably, the joining device comprises at least one filling member making it possible to fill a useful portion of one of the components to be welded in terms of mechanical strength, for example a chamfer. The component to be welded is therefore not weakened by the joining operation and is effectively welded. Each filling member is preferably made of PAEK thermoplastic matrix and may comprise glass fibers impregnated in the thermoplastic matrix.

In one embodiment, the joining device comprises at least one positioning guide extending protruding from the electrical insulation member, so as to facilitate the positioning of the component to be welded opposite the joining device. In such an embodiment, the component to be welded comprising for example a notch, the positioning guide is configured to cooperate by shape complementarity with the notch of the component to be welded. Preferably, each positioning guide is made of PAEK thermoplastic material.

The invention also relates to an assembly of a first component to be welded, a second component to be welded and at least one joining device as described previously, each component to be welded being made of a thermoplastic material comprising reinforcement fibers impregnated in a thermoplastic matrix, the joining device being configured to allow the joining of the first component to be welded and the second component to be welded according to a common welding zone, each component to be welded comprising an inner surface, the inner surface of the first component to be welded being mounted opposite the inner surface of the second component to be welded, the joining device being mounted between the inner surface of the first component to be welded and the inner surface of the second component to be welded, according to the common welding zone.

In a preferred embodiment, the joining device is pre-mounted on one of the two components to be welded.

Furthermore, the invention relates to a joining system comprising at least one joining device as described previously and at least one pressure member configured to apply a pressure, between 0.1 and 1.5 Mpa, to one of the components to be welded so as to compress together the first component to be welded, the joining device and the second component to be welded according to the common welding zone. The pressure member allows sufficient pressure to be applied to allow welding of the two components, by mixing the thermoplastic matrices of the two components to be welded, without damaging them.

Finally, the invention relates to a method for assembling a first component to be welded and a second component to be welded using the joining device as described previously, each component to be welded being made of a composite material comprising reinforcement fibers impregnated in a thermoplastic matrix, the method comprising:
- a step of positioning the joining device between the inner surfaces of the two components to be welded according to the common welding zone, the electrical insulation members being in contact with the inner surfaces of the two components to be welded, and
- a first step of heating the central portion of the heating film to an operating temperature higher than a melting temperature of the thermoplastic matrix of the components to be welded, by supplying lateral portions of the heating film with current, in order to assemble the components together.

Preferably, the method comprises after the first step of heating, a second step of heating the central portion to a consolidation temperature, lower than the operating temperature, so as to reinforce the welded zone between the two components to be welded.

Preferably, the consolidation temperature is between 200 and 270° C.

The invention further relates to a method for assembling a first component to be welded and a second component to be welded according to a common welding zone, configured to form a welded zone once the components to be welded are joined, each component to be welded being made of a composite material comprising reinforcement fibers impregnated in a thermoplastic matrix, each component to be welded having a flat inner surface to be welded, the internal surfaces of the components to be welded are positioned opposite each other, the method being carried out by means of a joining device, the joining device being configured to be at least partially integrated into the welded zone, the joining device comprising:
- at least one electrically conductive resistive heating film, the heating film having a first flat face and a second flat face opposite the first face, the heating film comprising:
  - a central connection portion, configured to be mounted according to the common welding zone between the inner surfaces of the two components to be welded in order to weld them, and two lateral electrical connection portions, configured to be mounted outside of the common welding zone, the lateral portions being configured to be electrically connected to a source of current so as to permit a rise in the temperature of the central portion to an operating temperature.

at least one first electrical insulation member, positioned in contact with the first face of the heating film opposite the central portion and configured to be positioned opposite the inner surface of the first component to be welded, and at least one second electrical insulation member, positioned in contact with the second face of the heating film opposite the central portion and configured to be positioned opposite the inner surface of the second component to be welded, the two electrical insulation members being configured to allow heat transfer and prohibit the flow of electric current between the heating film and each component to be welded.

The method comprises:

a step of positioning the joining device between the inner surfaces of the two components to be welded according to the common welding zone, the electrical insulation members being in contact with the inner surfaces of the two components to be welded, a first step of heating the central portion of the heating film to an operating temperature greater than a melting temperature of the thermoplastic matrix of the components to be welded, by supplying lateral portions of the heating film with current, so as to assemble the components together, and a second step of heating the central portion to a consolidation temperature, lower than the operating temperature, so as to reinforce the welded zone between the two components to be welded.

BRIEF DESCRIPTION OF THE DRAWINGS

The invention will be better understood upon reading the following description, given as an example, and by referring to the following figures, given as non-limiting examples, wherein identical references are given to similar objects.

FIG. 11 and

It should be noted that the figures set out the invention in detail in order to implement the invention, said figures may of course be used to better define the invention where applicable.

DETAILED DESCRIPTION

Figure 1:
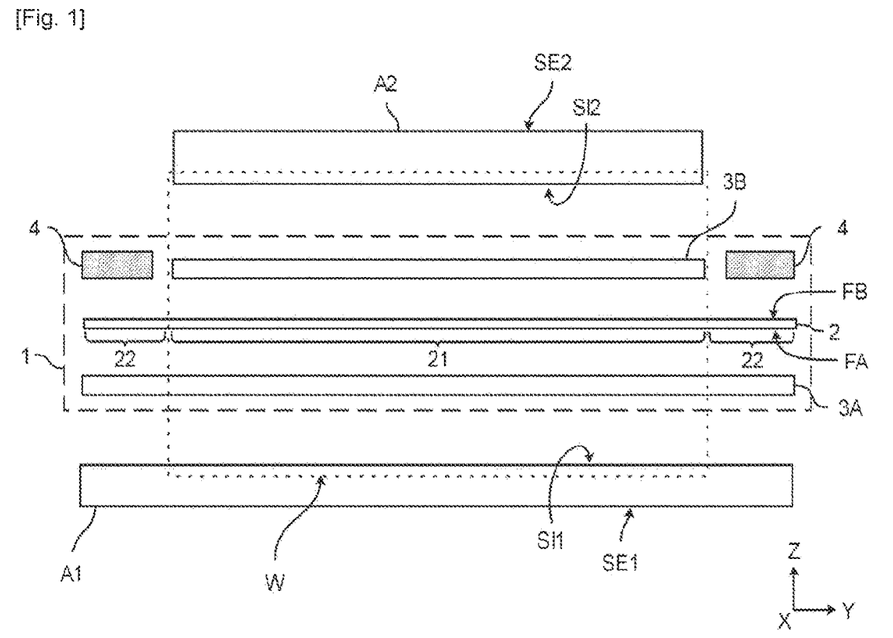
FIG. 1 is a schematic representation of an exploded view in longitudinal section of an assembly of two components to be welded and a joining device according to an embodiment of the invention.

The invention relates to a device for joining 1 a first component to be welded A1 and a second component to be welded A2 ([FIG. 1]. The invention applies in particular to the joining of components intended to be mounted on an aircraft.

The components to be welded A1, A2 are made of thermoplastic material and consist of reinforcement fibers impregnated in a thermoplastic matrix. Preferably, the thermoplastic matrix is a high-performance thermoplastic polymer resin, such as polyetherketone known under the acronym PEKK or polyaryletherketone known under the acronym PAEK, for example. Preferably, the reinforcement fibers are carbon fibers, giving the components to be welded A1, A2 both strength and lightness. However, it goes without saying that the thermoplastic matrix and the reinforcement fibers could come from different materials. Carbon fibers are current-conducting.

In reference to [FIG. 1], each component to be welded A1, A2 has a flat inner surface to be welded SI1, SI2 and an outer surface SI1, SI2, opposite the inner surface SI1, SI2.

The components to be welded A1, A2 are configured to be joined according to a common welding zone W and to be positioned in such a way as to place their respective inner surfaces SI1, SI2 opposite each other, as described in more detail later. The common welding zone W is intended to form a welded zone, once the components to be welded A1, A2 are joined. In this example, the welding zone W is straight, but it goes without saying that it could extend in various ways, in particular, curved.

The joining device 1 according to the invention is configured to be mounted between the two components to be welded A1, A2, so as to join them. Once the components to be welded A1, A2 are joined, the joining device 1 is at least partially integrated into the welded zone, as will be described in more detail later in this document. In other words, the joining device 1 is consumable and is configured to remain trapped at the interface between the two welded components A1, A2 at the end of the joining operation. It is thus advantageously no longer required to store or move large equipment when joining two thermoplastic components to be welded.

Figure 2:
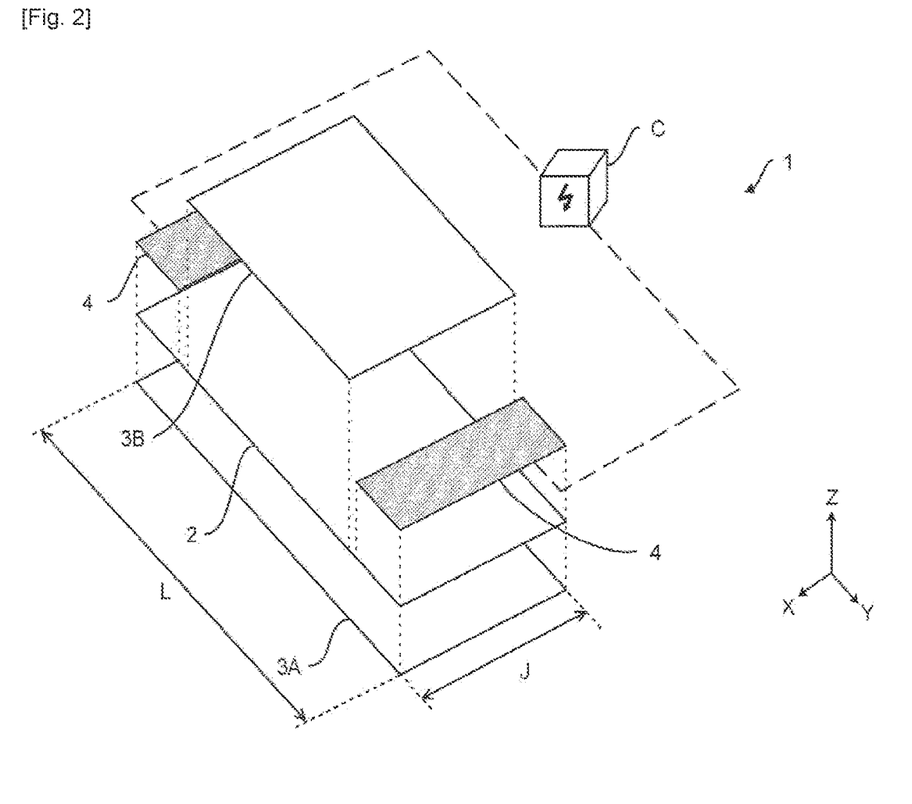
FIG. 2 is a schematic representation of a perspective view of the joining device of the assembly of FIG. 1.
Figure 3:
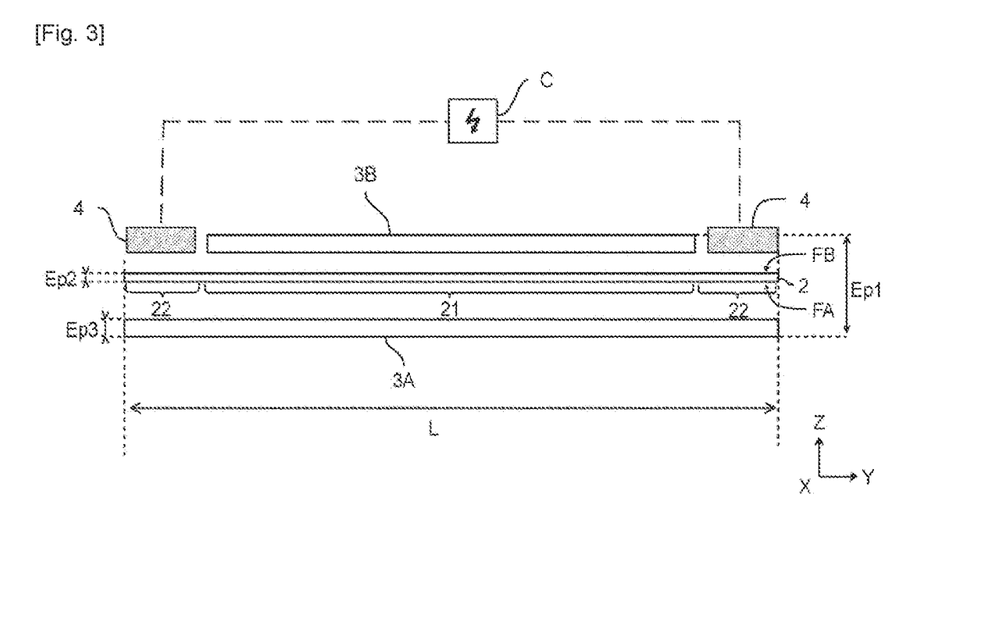
FIG. 3 is a longitudinal sectional view of the joining device of [FIG. 2]

In this example, in reference to FIGS. 2 and 3, the joining device 1 extends longitudinally along an X axis, laterally along a Y axis and vertically along a Z axis, so as to form an orthogonal point of reference (X, Y, Z). In reference to [FIG. 2], a longitudinal portion of the joining device 1 is shown for the sake of clarity. The length of the joining device 1 is adapted to the welding zone W.

In this embodiment, the joining device 1 comprises a resistive heating film 2 and two electrical insulation members 3A, 3B, positioned along the vertical axis Z on either side of the heating film 2 as well as two electrical connection members 4.

The heating film 2 is electrically conductive and is configured to be supplied by a source of current C. Preferably, the heating film 2 is in the form of a graphene film having a high electrical conductivity and a high resistance to heat. Alternatively, the heating film 2 may be made of a different material, for example, carbon nanotubes.

In reference to [FIG. 3], the heating film 2 has a first flat face FA (lower face) and a second flat face FB (upper face), opposite the first face FA. The heating film 2 thus has a flat and thin overall shape. More precisely, the heating film 2 has a length J extending along the longitudinal axis X (shown in [FIG. 2]), a width L extending along the lateral axis Y and a thickness Ep2 extending along the vertical axis Z (shown in [FIG. 3]). Thickness Ep2 is preferably between 1 μm and 50 μm. The heating film 2 is thus thin and light, and has little impact on the mechanical characteristics of the components to be welded A1, A2 and the assembly formed by the components to be welded A1, A2 and the joining device 1. In one variant, the thickness Ep2 is variable over the length J of the heating film 2, making it possible to vary the heating power locally. It goes without saying that the thickness Ep2 may also vary according to the width L of the heating film 2, along the Y axis.

Still in reference to [FIG. 3], the heating film 2 according to the invention comprises a central connection portion 21 and two lateral portions of electrical connection 22, extending from the lateral axis Y on either side of the central connection portion 21.

The central connection portion 21 is configured to be mounted according to the common welding zone W between the inner surfaces SI1, SI2 of the two components to be welded A1, A2 in order to weld them, as shown in [FIG. 1]. Conversely, the two lateral portions of the electrical connection 22 are configured to be mounted outside the common welding zone W.

The central portion 21 is configured to heat up to an operating temperature Tf, preferably between 330 and 450° C., which is higher than the melting temperature (which is known) of the thermoplastic matrix of the components to be welded A1, A2, as will be described in more detail later.

The two lateral portions of the electrical connection 22 are configured to be electrically connected, directly or indirectly, to the outer source of current C (shown in FIGS. 2 and 3) so as to enable a rise in temperature of the central portion 21 to the operating temperature Tf.

Figure 4:
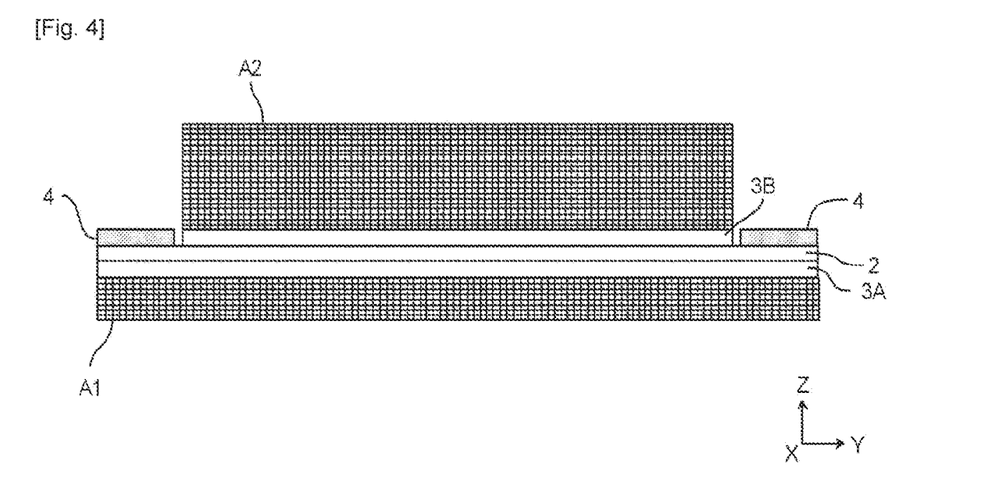
FIG. 4 is a schematic representation of two components to be welded comprising reinforcement fibers and the joining device of [FIG. 2], before joining.
Figure 5:
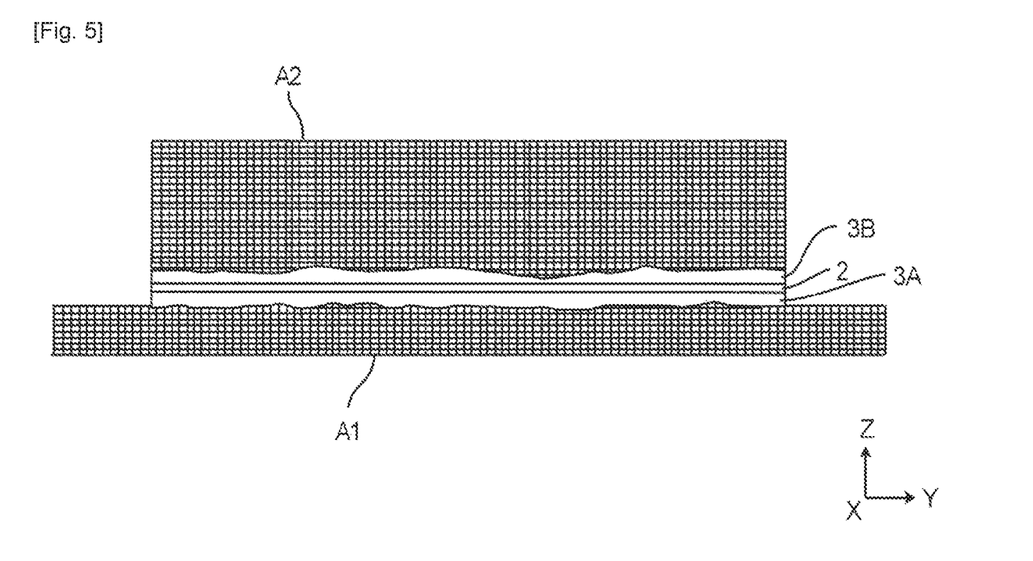
FIG. 5 is a schematic representation of two components to be welded comprising reinforcement fibers assembled by means of the joining device of [FIG. 2], after joining.

As shown in FIGS. 4 and 5, the heating film 2 mounted between the two components to be welded A1, A2 is configured to melt the thermoplastic matrix of the composite components to be welded A1, A2 to enable the welding thereof by mixing thermoplastic matrices. Heating the interface directly and quickly makes it possible to limit heat diffusion in the thickness of each component to be welded A1, A2. Only inner surfaces SI1, SI2 are melted, which ensures the integrity of the welded components A1, A2.

As described previously, in reference to FIGS. 1 to 3, the joining device 1 also comprises a first insulation member 3A and a second electrical insulation member 3B, positioned according to the thickness of the joining device 1, i.e. along the vertical axis Z, on either side of the heating film 2.

The first electrical insulation member 3A is positioned in contact with the first face FA of the heating film 2 opposite the central portion 21 and is configured to be positioned opposite the inner surface SI1 of the first component to be welded A1, as shown in [FIG. 1]. Similarly, the second electrical insulation member 3B is positioned in contact with the second face FB of the heating film 2 opposite the central portion 21 and is configured to be positioned opposite the inner surface SI2 of the second component to be welded A2. In other words, the heating film 2 is sandwiched between the two electrical insulation members 3A, 3B located above and below the heating film 2.

Each electrical insulation member 3A, 3B is configured to allow heat transfer and prohibit the flow of electrical current between the heating film 2 and each component to be welded A1, A2, so as to limit the risk of short-circuit or local overheating in the components to be welded A1, A2, ensuring their integrity. More precisely, as shown in [FIG. 4], each electrical insulation member 3A, 3B is configured to limit the risk of contact between the resistive heating film 2 and the conductive reinforcement fibers of the composite components to be welded A1, A2, as was the case in the prior art.

Preferably, each electrical insulation member 3A, 3B has a surface area greater than that of the common welding zone W. Thus, any contact between the heating film 2 and the components to be welded A1, A2 is prohibited, thus eliminating any electrical risk. Each electrical insulation member 3A, 3B thus forms an electrical insulation barrier between the heating film 2 and a component to be welded A1, A2.

For this purpose, each electrical insulation member 3A, 3B is preferably made of a composite material comprising a thermoplastic matrix, which has low electrical conductivity. More preferably, each electrical insulation member 3A, 3B is made of a high-performance thermoplastic material, such as PEKK or PAEK described previously. In one embodiment, each electrical insulation member 3A, 3B comprises non-conductive reinforcement fibers, for example glass fibers, impregnated in the high-performance thermoplastic matrix. Glass fibers make it possible to effectively eliminate the transfer of electrical energy to the components to be welded A1, A2. Such 3A, 3B electrical insulating members made of high-performance thermoplastic material are thus able to melt under the effect of heat and participate in the welding of components A1, A2, by mixing with the thermoplastic matrix of welded components A1, A2, as shown in [FIG. 5]. The non-conductive reinforcement fibers form an electrical insulation barrier.

Preferably, each electrical insulation member 3A, 3B is present in the form of an insulating film, thus having a thickness Ep3 (represented in [FIG. 3]) along the vertical axis Z preferably between 0.05 and 0.2 mm. Such a thickness Ep3 makes it possible to form a thin and space-saving joining device 1. Indeed, the assembly formed by the heating film 2 and the two electrical insulation members 3A, 3B does not therefore generate any significant overthickness, which allows the joining device 1 to remain in the welded zone after joining of the two components to be welded A1, A2, as described previously and shown in [FIG. 5], without impacting the mechanical characteristics of the components to be welded A1, A2. The electrical insulation members 3A, 3B may have identical or different thicknesses.

In summary, the assembly formed by the heating film 2 and the two electrical insulation members 3A, 3B preferably has a thickness Ep1 (shown in [FIG. 3]) of between 0.1 and 0.5 mm. Such a thickness does not affect the mechanical properties of the components to be welded A1, A2 and has little impact on the mass of the assembly and therefore of the aircraft.

In one embodiment, each electrical insulation member 3A, 3B has a variable thickness, preferably according to the lateral direction Y. This makes it possible to control the transfer of heat from the heating film 2 to the components to be welded A1, A2. In particular, the thickness of an electrical insulation member 3A, 3B may be greater near a lateral portion 22 compared to the central portion 21 in order to reduce the heating power at the edge of the welding zone W. The heat diffusion at the ends of the welding zone W is limited.

In a preferred embodiment, as shown in FIGS. 2 and 3, the joining device 1 further comprises two electrical connection members 4, each respectively positioned in contact with the two lateral portions 22 of the heating film 2 so as to enable the electrical connection of the heating film 2 to the source of current C. In other words, the source of current C is indirectly connected to the heating film 2 via the electrical connection members 4. This makes it possible to form a robust and practical connection. Preferably, each electrical insulation member 4 is configured to not be in contact with any of the components to be welded A1, A2 (as shown in [FIG. 1]).

Preferably, each electrical connection member 4 is in the form of a copper strip, electrically connected to the source of current C, for example by an electric cable. Alternatively, each electrical connection member 4 is in the form of a conductive ink deposited directly on one of the faces FA, FB of the heating film 2.

Preferably, as shown in FIGS. 2 and 3, the two electrical connection members 4 are mounted on the same face FA, FB of the heating film 2, in order to facilitate the assembly of the joining device 1.

Preferably, as the two electrical connection members 4 are mounted on the lateral portions 22 of the heating film 2, i.e. outside the common welding zone W, the latter are configured to be removed after the joining operation of the two components to be welded A1, A2. Also, in reference to [FIG. 5], the electrical connection members 4 are configured not to be integrated into the welded zone, which allows the electrical connection between the source of current C and the resistive heating film 2 to be cut off, making it possible to avoid the presence of a conductive element at the interface between the two components to be welded A1, A2 which may cause a short circuit, for example.

Preferably, the lateral portions 22 are detachable, so that they may be removed after the joining operation. In a preferred embodiment, the heating film 2 has a pre-cut, for example a partially detached dotted line between the central portion 21 and each lateral portion 22, for simple and quick removal. Advantageously, such a pre-cut makes it possible to remove the lateral portions 22 and the electrical connection members 4 in a single operation. Thus, after joining, the joining device is no longer visible.

Figure 6:
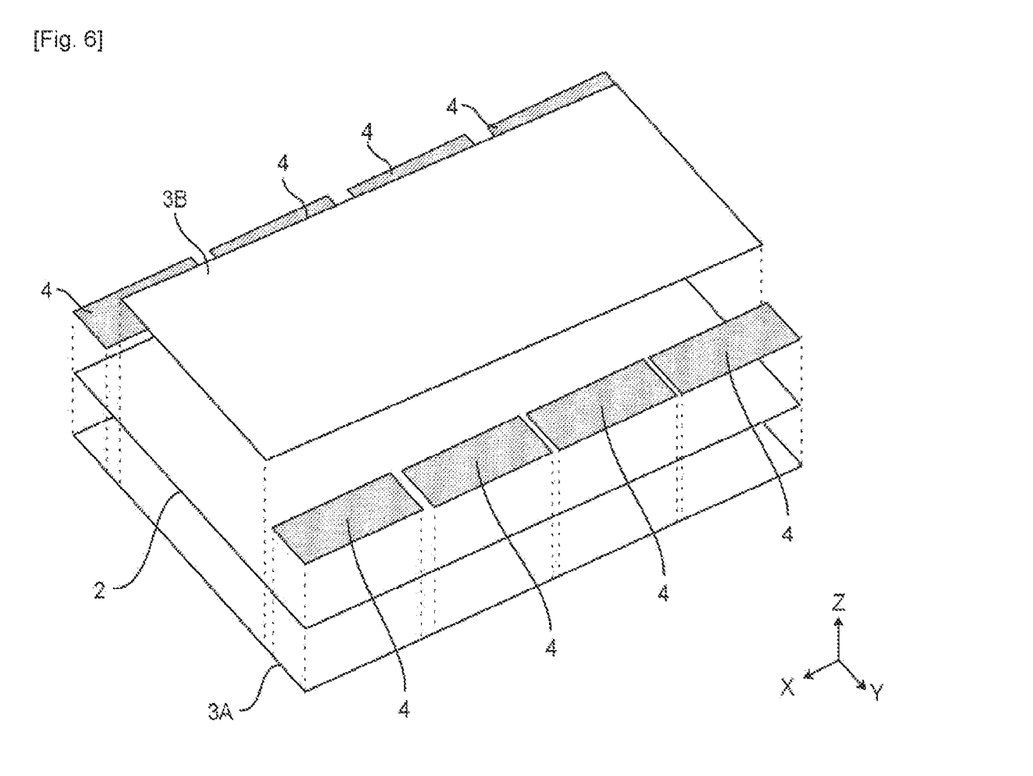
FIG. 6 is a schematic representation of a joining device according to an alternative embodiment of the invention.

It goes without saying that the joining device 1 could comprise a different number of electrical connection members 4, as shown for example in [FIG. 6]. By way of example, in the case of components to be welded A1, A2 having significant dimensions, the joining device 1 may comprise a heating film 2 and two electrical insulation members 3A, 3B extended longitudinally, in this example along the longitudinal axis X. The joining device 1 then comprises a plurality of electrical connection members 4, aligned along the lateral portions 22 of the heating film 2, along the entire length of the heating film 2, along the X axis.

Indeed, the temperature rise in the heating film 2 is optimal between two electrical connection members 4, an electrical connection of each lateral portion 22 is thus optimally ensured over its entire length, ensuring heating of the entire heating film 2, even if it has significant dimensions.

The presence of a plurality of electrical connection members 4 also allows controlling the heating power for each longitudinal portion of the heating film 2. The heating power may thus be configured according to the thicknesses of the components to be welded A1, A2. The joining device 1 is thus adaptable.

Preferably, the joining device 1 may be packaged in the form of individual elements or in the form of a roll that may be cut to the desired length.

Thanks to the joining device 1, the heating film 2 according to the invention allows uniform, fast and homogeneous heating of the entire surface of the inner surfaces SI1, SI2 of each component to be welded A1, A2 at the central connection portion 21, while limiting the risk of local overheating. The resistive heating film 2 allows control of the heating temperature of the central portion 21 by control of the voltage applied via the lateral portions of the electrical connection 22. Such a control makes it possible to precisely manage the temperature increase of the heating film 2 and to maintain a stable temperature step to ensure the homogeneous mixing of the thermoplastic matrices of the components to be welded A1, A2 and the joining device 1 (as shown in [FIG. 5]), as well as the control of the crystallinity rate of the thermoplastic matrix. Optimum mechanical performance is thus guaranteed, even at the interface between the two components to be welded A1, A2 once they are joined together. The presence of electrical insulation members 3A, 3B eliminates any electrical risk while guaranteeing optimum heat transfer. The joining device 1, due to its thin thickness, acts as a double-sided adhesive tape to join two components to be welded A1, A2 opposite each other in a robust manner and without degradation of mechanical performance.

Figure 7:
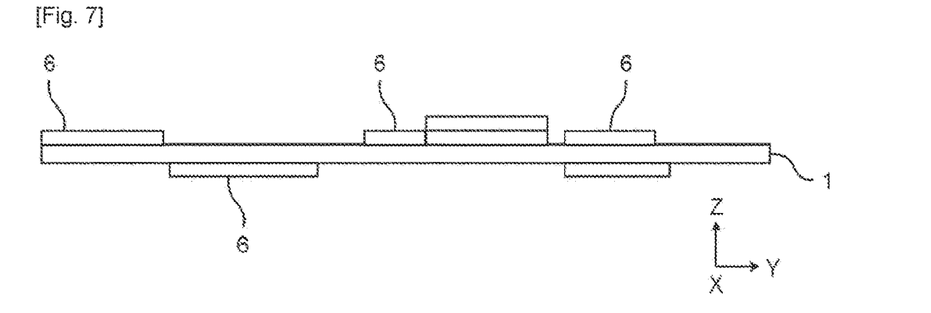
FIG. 7 is a schematic representation of the joining device of [FIG. 3] comprising a plurality of thickness compensating members.

In an embodiment, shown in [FIG. 7], the joining device 1 comprises one or more thickness compensating members 6, making it possible to compensate for a height difference, a docking defect or a relief, for example, on one of the inner surfaces SI1, SI2 of the components to be welded A1, A2.

In a preferred embodiment, each thickness compensating member 6 is made of a thermoplastic material. Preferably, each thickness compensating member 6 is manufactured in a high-performance thermoplastic matrix such as PEKK or PAEK described previously. In one embodiment, each thickness compensating member 6 comprises glass fibers impregnated in a PEKK or PAEK thermoplastic matrix. More preferably, each thickness compensating member 6 is manufactured in the high-performance thermoplastic matrix of each electrical insulation member 3A, 3B, the thermoplastic matrix of each electrical insulation member 3A, 3B being itself preferably identical to the thermoplastic matrix of the components to be welded A1, A2. Thus, the joining device 1 is entirely made of the same material, making it possible to avoid the risk of discontinuity of components which would have different mechanical characteristics.

Each thickness compensating member 6 is preferably mounted on one of the electrical insulation members 3A, 3B and is positioned between the electrical insulation member 3A, 3B concerned and the inner surface SI1, SI2 of the component to be welded A1, A2 placed opposite. The thickness compensating member 6 is applied in an added manner as required by the operator.

Figure 8:
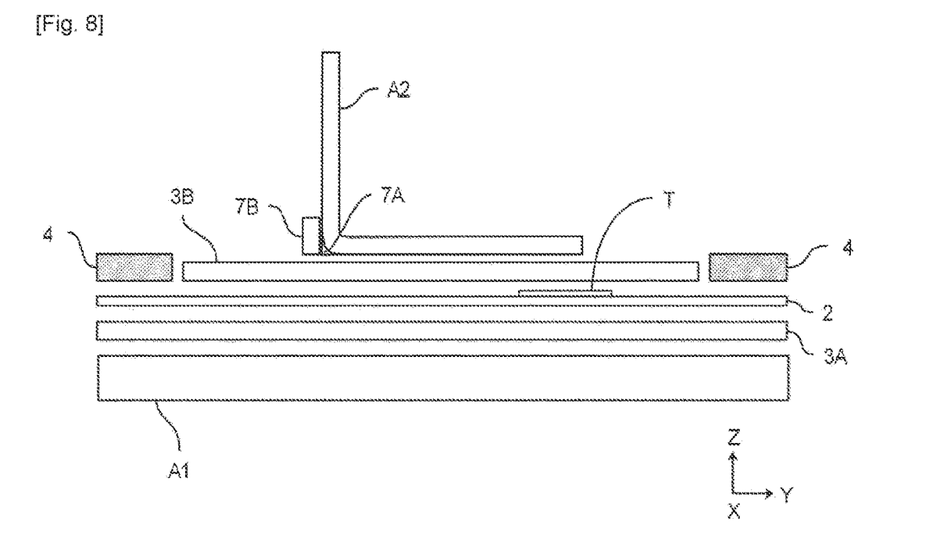
FIG. 8 is a schematic representation of the assembly of [FIG. 1], wherein the securing device comprises a filling member.

In an embodiment shown in [FIG. 8], the joining device 1 comprises an internal temperature measuring member T, so as to control in real time the temperature inside the joining device 1 itself, i.e. in the common welding zone W. Preferably, the internal temperature measuring member T is mounted directly on the heating film 2, allowing an optimal reading of the temperature of the heating film 2. It is thus possible to stop the operation in the event of overheating of the heating film 2, which makes it possible to eliminate any risk of damage to the components to be welded A1, A2. Preferably, the internal temperature measuring member T is in the form of one or more Bragg grating optical fibers inserted between the heating film 2 and one of the electrical insulation members 3A, 3B. Such a measuring member of the temperature T also allows temperature descent to be controlled in order to optimize the crystallization of the material.

In an embodiment, still in reference to [FIG. 8], the joining device 1 comprises a filling member 7A making it possible to cooperate with a portion of a component to be welded A1, A2 in order to form a flat inner surface, the portion being useful in terms of mechanical strength during the joining operation. Such a useful portion may be in the form of a chamfer, for example. It goes without saying that the joining device 1 may comprise a different number of filling members 7A, according to the needs and fragile or useful zones in terms of mechanical strength of the two components to be welded A1, A2. Preferably, the filling member 7A is in the form of a groove positioned at the curvature zone of a component to be welded A1.

Each filling member 7A is preferably made of high-performance thermoplastic resin, preferably PEKK or PAEK thermoplastic material. Each filling member 7A may also comprise glass fibers, impregnated in a thermoplastic matrix.

In one embodiment, the joining device 1 also comprises a removable locking member 7B, configured to be positioned on the surface of the electrical insulation member 3A, 3B against the filling member 7A, so as to sandwich it between the locking member 7B and the useful portion of the component to be welded A1, A2. The blocking member 7B is configured to be thrust against the filling member 7A, so as to ensure that the filling member 7A, intended to melt under the effect of the heat emitted by the heating film 2, does not sink and does not locally generate an unintended overthickness.

Figure 9:
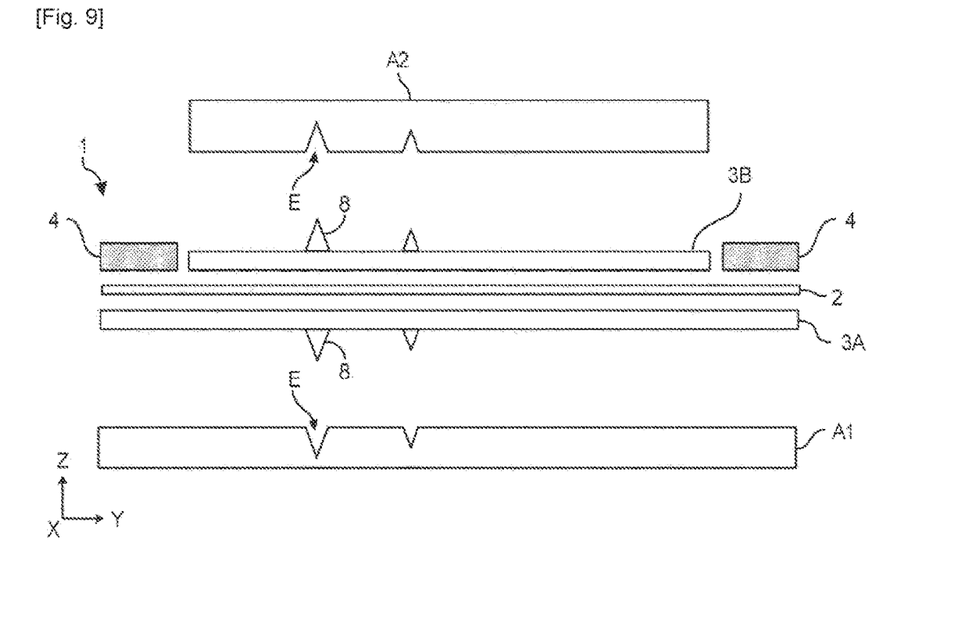
FIG. 9 is a schematic representation of the assembly of [FIG. 1], wherein the securing device comprises a positioning guide.

In an embodiment, shown in [FIG. 9], the joining device 1 comprises one or more positioning guides 8 extending protruding from one of the electrical insulation members 3A, 3B, so as to facilitate the positioning of the component to be welded A1, A2 opposite the joining device 1. In this case, the component to be welded A1, A2 comprising, for example, a notch E, the positioning guide 8 is configured to cooperate, by complementarity of shape, with the notch E of the component to be welded A1, A2. Preferably, each positioning guide 8 is made of thermoplastic resin, preferably of PEKK or PAEK high-performance thermoplastic material.

Figure 10:
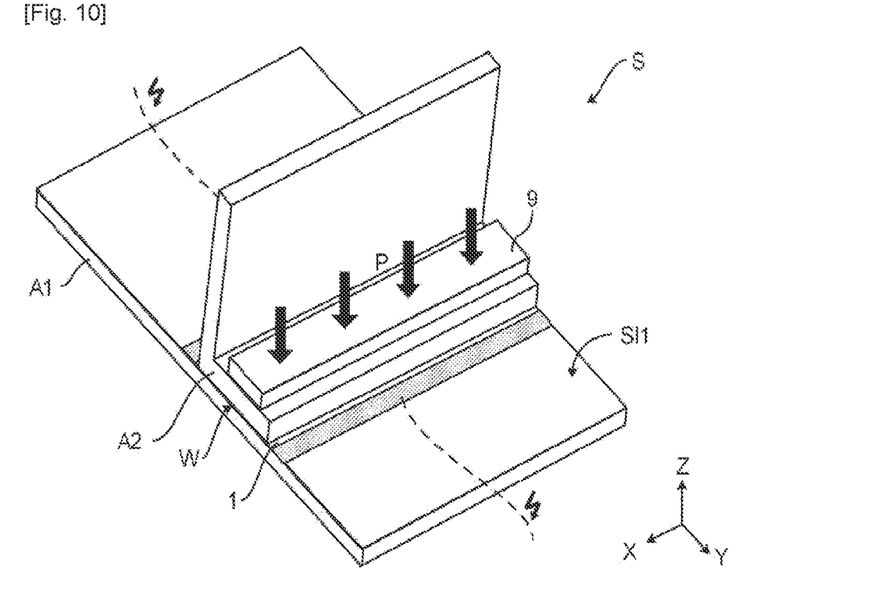
FIG. 10 is a schematic representation of a joining system comprising the joining device of [FIG. 2] and a pressure member according to one embodiment of the invention.
Figure 11:
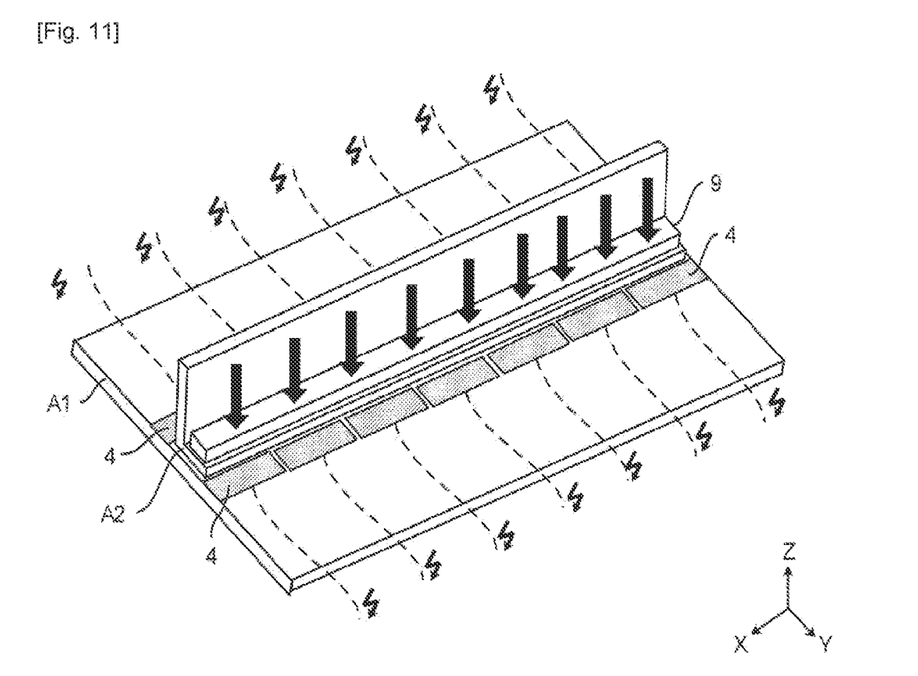
Figure 12:
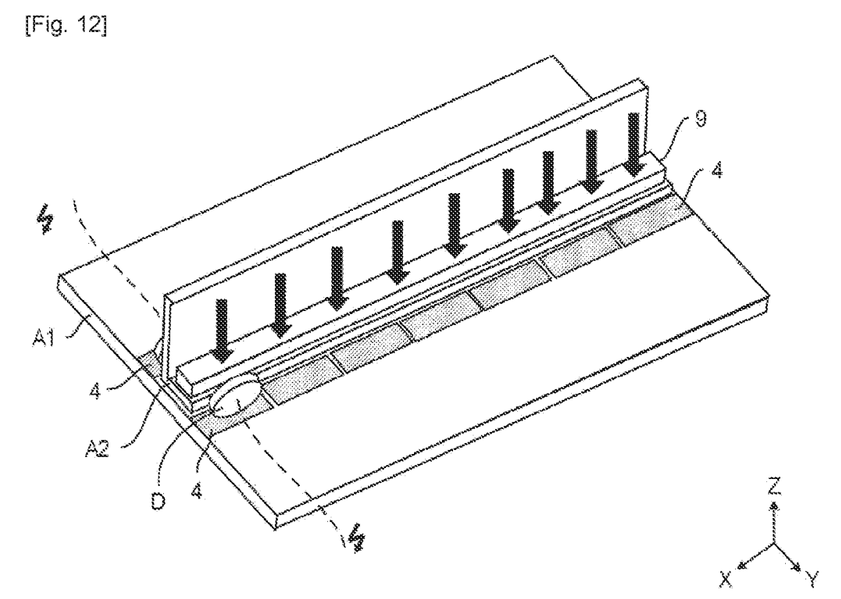
FIG. 12 are schematic representations of a joining system comprising the joining device of [FIG. 6] and a pressure member according to two alternative embodiments of the invention.

FIGS. 10 to 12 show a joining system S comprising a first component to be welded A1, a second component to be welded A2, a joining device 1 as described previously and a pressure member 9. The joining device 1 is mounted between the inner surface SI1 of the first component to be welded A1 and the inner surface SI2 of the second component to be welded A2 according to the common welding zone W.

In one embodiment, the joining device 1 is pre-mounted on the inner surface SI1, SI2 of one of the two components to be welded A1, A2, allowing both easier transport of each element and faster assembly of the joining system S.

The pressure member 9 is configured to apply pressure P to one of the components to be welded A1, A2 in order to compress the assembly formed by the first component to be welded A1, the joining device 1 and the second component to be welded A2 according to the common welding zone W. The pressure member 9 is configured to apply a sufficient pressure P to allow for the joining of the two components to be welded A1, A2, by mixing the thermoplastic matrices of the two components to be welded A1, A2, when they are melted. Preferably, the pressure member 9 is configured to apply a pressure P of between 0.1 and 1.5 MPa.

In reference to FIGS. 11 and 12, in the case of the joining of components to be welded A1, A2 having significant dimensions (in this example along the longitudinal axis X), the joining device 1 preferably comprises several electrical connection members 4 extending along the longitudinal axis X, as described previously. In this case, in a first embodiment, each electrical connection member 4 is independently connected to the source of current, as shown in [FIG. 11]. The entire heating film 2 is then configured to heat up simultaneously, allowing a rapid connection of the entire common welding zone W. As explained previously, the heating power may be adapted locally according to the thicknesses to be welded.

In a second embodiment, shown in [FIG. 12], the joining system S further comprises a connection device D, configured to move along the X axis successively on each electrical connection member 4, so as to locally allow progressive heating of the heating film 2, along the longitudinal axis X. The connection device D is preferably in the form of a roll, capable of enabling the connection of each electrical connection member 4 by contacting the roll on the electrical connection member 4. Such an embodiment makes it possible, for example, to dispense with the installation of a plurality of connection cables.

A single joining device 1 was presented, but it goes without saying that several joining devices 1 could be combined together in order to locally vary the heating power or the docking thickness.

A method of joining two thermoplastic components to be welded shall now be described, in reference to [FIG. 13]. The joining method allows the joining of a first component to be welded A1 and a second component to be welded A2, as described previously, and is carried out by means of the joining device 1 and the joining system S described previously.

Figure 13:
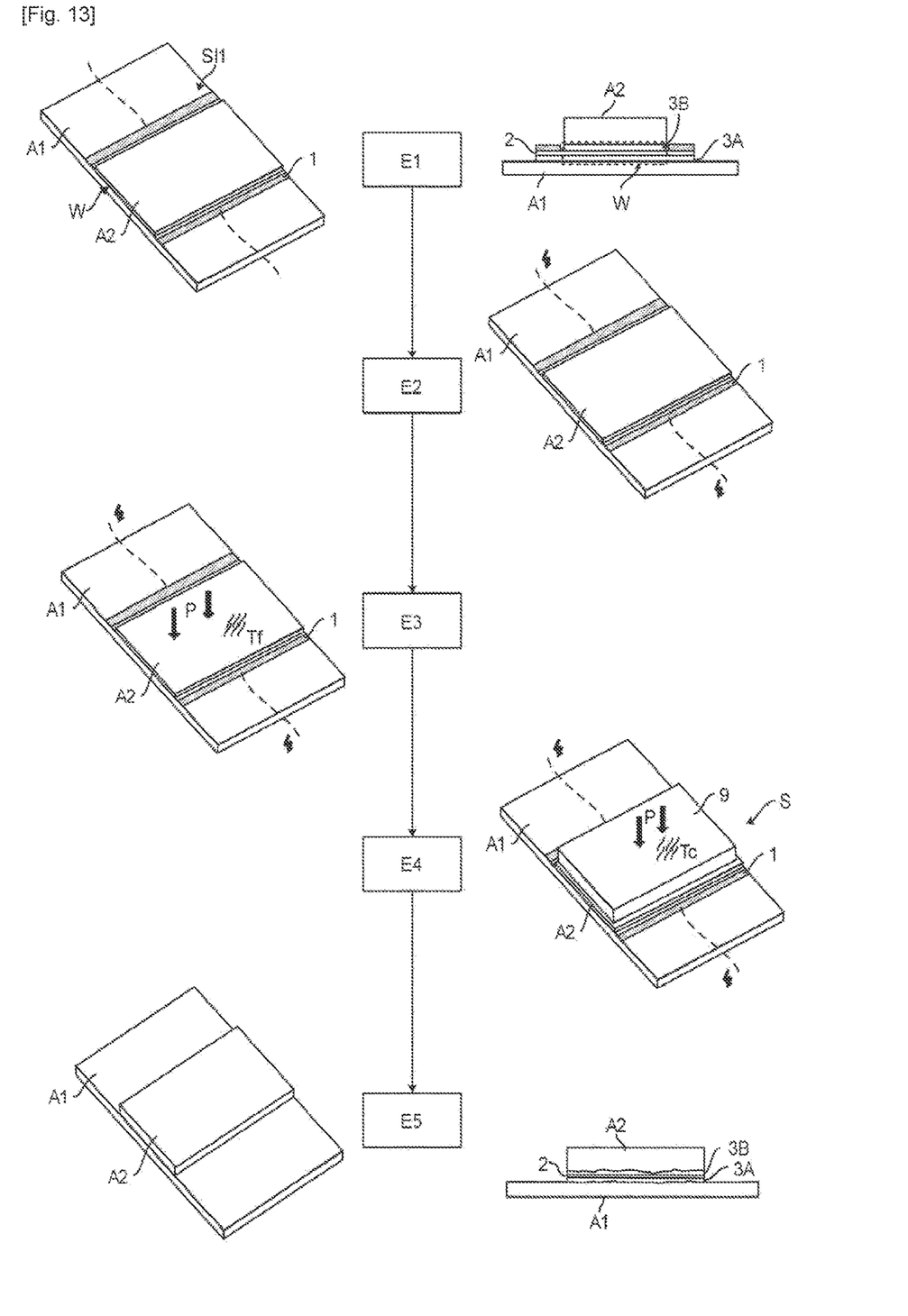
FIG. 13 is a schematic representation of the steps of a joining method according to one embodiment of the invention.

As shown in [FIG. 13], the method according to the invention first comprises a step of positioning E1 of the joining device 1 between the inner surfaces SI1, SI2 of the two components to be welded A1, A2 according to the common welding zone W. To do this, an operator positions the joining device 1 on the inner surface SI1 of the first component to be welded A1 at the common welding zone W, the first component to be welded A1 thus serving as a support for the joining device 1. The operator then positions the second component to be welded A2 on the joining device 1 at the common welding zone W, so that the joining device 1 is sandwiched between the inner surface SI1 of the first component to be welded A1 and the inner surface SI2 of the second component to be welded A2.

In a second step of connecting E2, the operator then connects, in this example, the electrical connection members 4 to the source of current C and actuates the source of current C by increasing its voltage so as to electrically supply the electrical connection members 4. The current is then transmitted to the lateral connection portions 22 of the heating film 2.

The method then comprises a first step of heating E3 the central portion 21 of the heating film 2 by supplying lateral portions 22 with current. The temperature of the central portion 21 increases until reaching the operating temperature Tf, for example between 330° C. and 450° C. which is higher than the melting temperature of the thermoplastic matrix of each component to be welded A1, A2, at the inner surface SI1, SI2, via each electrical insulation member 3A, 3B. The melted thermoplastic matrices of the two components to be welded A1, A2 mix with the thermoplastic matrices of the electrical insulation members 3A, 3B to form a strong connection. Thanks to the joining device 1 according to the invention, the thermoplastic matrix of the inner surfaces SI1, SI2 of the components to be welded A1, A2 may melt, without the electrical energy flowing in the heating film 2 being transferred to the reinforcement fibers of each component to be welded A1, A2, thus avoiding any risk of short-circuiting for example.

During heating, the operator applies a uniform pressure P by means of a pressure member 9 to the two components to be welded A1, A2 in order to limit their relative movements and to allow mixing of material.

Once the thermoplastic matrices of the two components to be welded A1, A2 have melted, the operator decreases the voltage of the source of current C, so as to lower the temperature of the heating film 2. The method then comprises a second step of heating E4, of the central portion 21 of the heating film 2 to a consolidation temperature Tc lower than the operating temperature Tf, for example between 200 and 270° C., so as to weld together the two components to be welded A1, A2 under the effect of the pressure P applied by the pressure member 9 which allows uniform welding. Indeed, in this step, by cooling, the mixed thermoplastic matrices of the two components to be welded A1, A2 solidify, in order to form the welded zone. Thanks to the electrical connection members 4, the temperature of the central portion 21 of the heating film 2 is managed sequentially. Such a second step of heating E4 makes it possible to gradually lower the temperature of the heating film 2, which makes it possible to maintain the mechanical characteristics of each thermoplastic matrix intact, making it possible to prevent the formation of large crystals in the welded area.

After solidifying the thermoplastic matrices of the two components to be welded A1, A2, the central portion 21 of the heating film 2 is mixed with the thermoplastic matrices of the components to be welded A1, A2. In other words, the central portion 21 of the heating film 2 is trapped at the interface between the two components to be welded A1, A2, in the welded area.

When the material comprising the mixture of the two thermoplastic matrices of the two components to be welded A1, A2 at the welded zone is solidified, the method comprises a step of removing E5 the lateral portions 22 of the heating film 2 and the electrical connection members 4, so as to remove any means of electrical connection. As the heating film 2 is no longer supplied with electrical power, there is no risk of a short circuit. Only remaining in the welded zone are the middle portion 21 of the heating film 2 and the electrical insulation members 3A, 3B. Such a step of removing E5 may be performed for example by detaching the lateral portions 22 according to dotted lines. formed on a pre-cut line.

The invention claimed is:

1. A device for joining a first component to a second component by welding a common welding zone to form a welding zone with a welded area once the components are joined, each component to be welded being made of a composite material comprising reinforcement fibers impregnated in a thermoplastic matrix and a flat inner surface to be welded, the flat inner surfaces of the first and second components to be welded being positioned opposite each other, the device for joining being configured to be at least partially integrated into the welded area, the device for joining comprising:
   at least one electrically conductive resistive heating film, the heating film having a first flat face and a second flat face opposite the first flat face, the heating film comprising:
      a central connection portion configured to be mounted according to the common welding zone between the flat inner surfaces of the first and second components, and
      two electrical connection lateral portions configured to be mounted outside of the common welding zone and electrically connected to a source of current so as to enable a rise in a temperature of the central portion to an operating temperature,
   at least one first electrical insulation member positioned in contact with the first flat face of the heating film opposite the central connection portion and configured to be positioned opposite the flat inner surface of the first component to be welded,
   at least one second electrical insulation member positioned in contact with the second flat face of the heating film opposite the central connection portion and configured to be positioned opposite the flat inner surface of the second component to be welded,
   the at least one first electrical insulation member and the at least one second electrical insulation member being allowed to heat transfer and prohibit electric current flow between the heating film and each of the first and second components to be welded, and
   an assembly formed by the heating film and the at least one first electrical insulation member and the at least one second electrical insulation member having a thickness of between 0.1 mm and 0.5 mm, and wherein the heating film being a graphene film.

2. The device for joining according to claim 1, wherein each electrical insulation member is made of a composite material comprising a thermoplastic matrix.

3. The device for joining according to claim 1, wherein each electrical insulation member comprises glass fibers.

4. The device for joining according to claim 1, wherein each electrical insulation member is in the form of an insulating film, with a thickness of between 0.05 and 0.2 mm.

5. The device for joining according to claim 1, wherein the heating film has a length extending along a longitudinal axis, the heating film has a variable thickness over the length.

6. The device for joining according to claim 1, comprising at least two electrical connection members, respectively positioned in contact with the two lateral portions of the heating film so as to enable the electrical connection of the heating film to the source of current.

7. The device for joining according to claim 1, wherein the operating temperature is between 330 and 450° C.

8. The device for joining according to claim 1, comprising at least one thickness compensating member, positioned on at least one of the electrical insulation members, so as to compensate for a gap between the electrical insulation member and the component to be welded, the thickness compensating member being formed at least partially of thermoplastic matrix.

9. The device for joining according to claim 1, wherein the heating film has a thickness of between 0.0002 and 0.05 mm.

10. An assembly comprising a first component to be welded, a second component to be welded, and at least one joining device according to claim 1, wherein each component to be welded is made of a composite material comprising reinforcement fibers impregnated in a thermoplastic matrix, the joining device being configured to allow the joining of the first component to be welded and the second component to be welded according to a common welding zone, each component to be welded comprising an inner surface, the inner surface of the first component to be welded being mounted opposite the inner surface of the second component to be welded, the joining device being mounted between the inner surface of the first component to be welded and the inner surface of the second component to be welded according to the common welding zone.

11. A joining system comprising at least one joining device according to claim 1 and at least one pressure member configured to apply a pressure, between 0.1 and 1.5 MPa, to one of the components to be welded so as to compress together the first component to be welded, the joining device and the second component to be welded according to the common welding zone.

12. A method for assembling a first component to be welded and a second component to be welded by means of the joining device according to claim 1, each component to be welded being made of a composite material comprising reinforcement fibers impregnated in a thermoplastic matrix, the method comprising:
    a step of positioning the joining device between the inner surfaces of the two components to be welded according to the common welding zone, the electrical insulation members being in contact with the inner surfaces of the two components to be welded, and
    a first heating step of the central portion of the heating film at an operating temperature greater than a melting temperature of the thermoplastic matrix of the components to be welded, by supplying lateral portions of the heating film with current so that the components are joined together.

13. The method for assembling according to claim 12, comprising, after the first step of heating, a second step of heating the central portion at a consolidation temperature, lower than the operating temperature, so as to reinforce the welded zone between the two components to be welded.

* * * * *